July 28, 1953            L. E. LIGHTON            2,647,159

STORAGE BATTERY FILLING AND VENTING STRUCTURE

Filed Dec. 2, 1949            2 Sheets-Sheet 1

INVENTOR
LESTER E. LIGHTON

BY
Edward J. Dwyer
ATTORNEY

July 28, 1953     L. E. LIGHTON     2,647,159
STORAGE BATTERY FILLING AND VENTING STRUCTURE
Filed Dec. 2, 1949     2 Sheets-Sheet 2

INVENTOR
LESTER E. LIGHTON
BY
Edward J. Dwyer
ATTORNEY

Patented July 28, 1953

2,647,159

UNITED STATES PATENT OFFICE 2,647,159

STORAGE BATTERY FILLING AND VENTING STRUCTURE

Lester E. Lighton, Glenside, Pa., assignor to The Electric Storage Battery Company, a corporation of New Jersey Application December 2, 1949, Serial No. 130,685

11 Claims. (Cl. 136—177)

The invention relates to filling and venting structures for electric storage batteries and, more particularly to that type of vent structure that has incorporated therein improved means for controlling the level of the electrolyte within a storage battery cell and for determining the level of the electrolyte within the cell.

In the care and maintenance of storage batteries, there are two problems that are difficult to overcome either because of the difficulty of service or because of the laxity of the attendant. The first problem i. e. determination of when water should be added to a cell to restore the proper electrolyte level, and the second i. e. filling the cell to the proper level, are both phases of the general aim which is to maintain a battery in such a condition that maximum capacity and life can be derived therefrom.

Many automotive and other type batteries known in the art are provided with an annular flange, shoulder, or other level gauging indicia, internally of the vent opening or vent well. Such device provides a fixed point to which the cell should be filled and if the electrolyte level falls below such point, additional liquid should be added. As a general rule the vent opening or vent well is provided with a vent plug held in operative relation to the vent opening by means of interengaging threads, bayonet joints, or like mechanical expedients, the purpose of such vent plugs being to prevent leaking or creepage of electrolyte and yet to permit escape of gases evolved within the cell during periods of battery activity.

Such prior art devices are unsatisfactory in two respects. In order to ascertain electrolyte level, the vent plugs must be removed, often a time-consuming and disagreeable job due to the location of batteries in automobiles, trucks, and the like. Additionally since the vent plugs are completely removed from the cell, they may be dropped and broken, or lost, thereby necessitating replacement. Furthermore, by reason of poor light in those locations, it is difficult to determine initially the electrolyte level with respect to the fixed point within the vent well and, in addition, it is difficult to add water in the proper quantity to bring the electrolyte up to the proper level.

It is, therefore, an object of the invention to provide a structure of the type set forth above that functions positively and automatically to indicate that the cell of a storage battery has been filled with electrolyte to a proper level.

A further object of the invention is to provide a filling and venting structure wherein the closure member effectually prevents the loss of electrolyte from the cell but which permits the elimination of interengaging threads, bayonet joints, or like mechanical devices conventionally used to maintain the necessary relationship between the closure member and the filling opening.

Another object of the invention is to provide a structure of the type set forth above which will incorporate as an integral part thereof means for readily determining whether or not the electrolyte is being maintained at a proper level.

Other objects of the invention will be apparent from the description and claims that follow.

In the drawing, like numerals are used to designate like elements.

Figure 1:
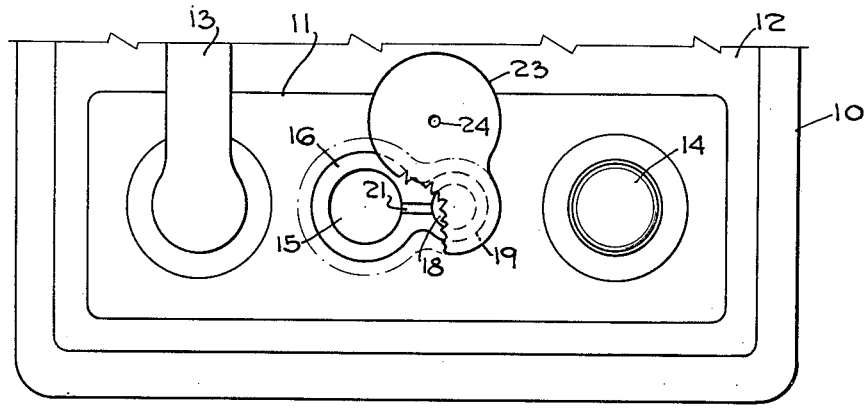
Figure 1 is a top plan view of one cell of an electric storage battery provided with my invention shown the closure member in the open or filling position.

Referring now to the drawing, 10 indicates a storage battery container, only a portion thereof being shown, such portion including one cell having a cell cover 11 surrounded by sealing compound 12. Cell cover 11 is provided conventionally with intercell connector 13 and terminal 14.

A filling or other opening 15 formed in cell cover 11 is surrounded by a boss or collar 16 extending above cell cover 11 and filling tube 17 extending downwardly from said cover to a point within the cell that represents the maximum desirable electrolyte level. It will be understood that boss 16 and filling tube 17 can, as shown, be conventionally molded as integral parts of cell cover 11 or formed as a separate piece, or pieces, and affixed to said cover within or surrounding filling opening 15 in any desired manner.

Figure 4:
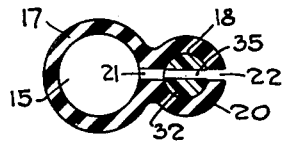
Figure 4 is a view taken along the line 4—4 in Figure 2.
Figure 3:
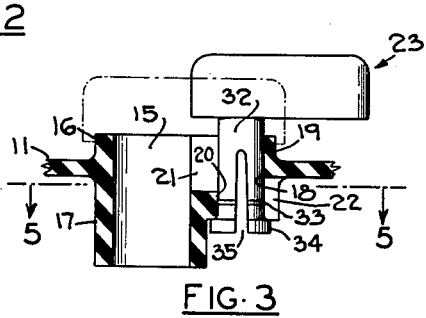
Figure 3 is an elevational view partially in cross section showing the closure in an open position.

Spaced from filling opening 15 in cell cover 11 is a second opening 18 vertically defined by boss 19 and downwardly extending tube 20 constructed in a manner similar to boss 16 and filling tube 17. As best shown in Figures 3 and 4, bosses 16 and 19, and tubes 17 and 20 are formed with a portion of their walls in common, such common portion being provided with vertical slot 21 in the upper portion thereof whereby communication is afforded between the interior of filling tube 17 and tube 20. An additional vertical slot 22 is formed in the wall of tube 20 extending beneath cell cover 11 and is diametrically opposed to slot 21. It should be noted that slot 22 is formed with the upper end slightly overlapping the lower end of slot 21. The purpose and advantages of this construction will be made apparent hereinafter.

A closure member, generally indicated at 23 and provided with a venting opening 24 is preferably formed from a material such as hard or semi-soft rubber, or a synthetic resin such as, for example, polyethylene, methyl methacrylate, polystyrene or the like. It will be noted that such closure member is so designed as to be capable of being molded, if so desired, by any conventional method.

In the closed position, closure member 23 is in close engagement with the outer wall of boss 16 and boss 19 as shown at 25 and 26 respectively. The inner wall of boss 16 is engaged by annular flange 27 downwardly extending from closure 23. In this position, communication between filling opening 15 and the atmosphere is provided by passage 28, formed in the body of closure 23, and venting opening 24. Within passage 28 is positioned baffle 29 provided with apertures 30 and 31 offset from venting opening 24 to break the direct line of communication between filling opening 15 and venting opening 24. Such arrangement of baffles and apertures is illustrative only and does not foreclose other arrangements or structures producing the same functional results.

Figure 2:
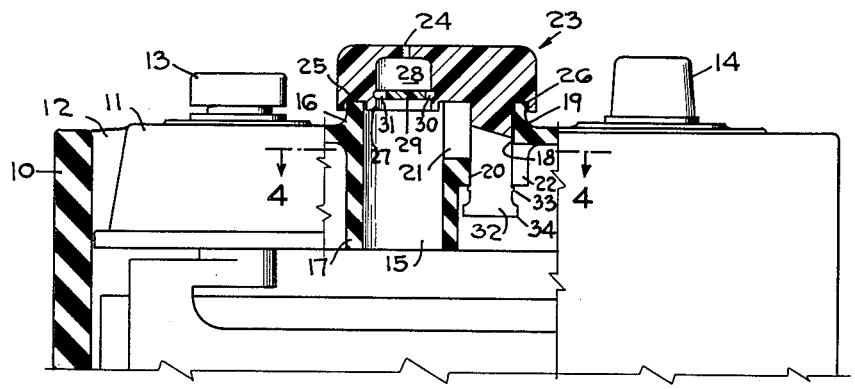
Figure 2 is an elevational view partially in cross section showing the closure member in the closed position with relation to an otherwise conventional storage battery cell.
Figure 5:
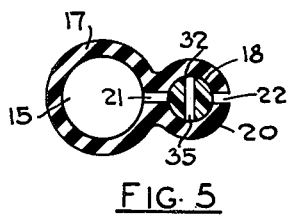
Figure 5 is a view taken along the line 5—5 in Figure 3.

The end of closure 23 that engages boss 19 is provided with a downwardly extending arm 32 movably yet snugly positioned within opening 18, boss 19, and tube 20, and extends below the lower end of said tube. Such arm is formed with external shoulders 33 and 34 and with a vertical slot 35 in the lower portion thereof. As is clearly illustrated in Figure 4, when vent plug 23 is in the closed position, slot 35 is so constructed and arranged as to register with slots 21 and 22 in the walls of tubes 17 and 20 respectively, and shoulder 33, contacting the lower end of tube 20 retains closure 23 seated with relation to filling opening 15. Conversely, referring to Figures 2 and 5, when closure 23 is in the open position, slot 35 is approximately 90° out of registry with slots 21 and 22 and blocks the communication between said slots. It will be understood that the phrase "vertical slot" as used herein can be construed as meaning the specific structure shown and as also including any other type of apertures such as, for example, square, circular, or elliptical orifices, that will permit venting from the interior of the storage battery through tube 20, arm 32, filling tube 17 and thence to the atmosphere, and that can be blocked by the rotation of arm 32.

The operation of the device is as follows:

During actual use of the battery, closure 23 is maintained in the closed position shown in Figures 3 and 4 by shoulder 33 abutting the lower end of tube 20. In this position slots 22, 35 and 21 permit venting of gases evolved in the cell. From slot 21 the gases pass through filling opening 15, passage 28, apertures 30 and 31 and vent opening 24 in the top of closure 23 to the atmosphere outside the cell.

When it is necessary to add water to the electrolyte in the cell, closure 23 is lifted, arm 32 sliding vertically upward within tube 20 and boss 19 until shoulder 34 contacts the lower edge of the tube. It will be noted that arm 32, being slotted, is wedged slightly in tube 20 and compressed thus holding closure 23 in the raised position. The closure is then turned approximately 90° from the closed position, such action being illustrated in Figure 1, thereby exposing filling opening 15 and permitting the insertion of a hydrometer for test purposes, or the nozzle of a hose for the addition of water.

Due to the friction fit of arm 32 within tube 20, the act of turning closure 23 from the closed position as indicated by the dotted lines in Figure 1 to the open position as indicated by the solid lines in the same figure, results in breaking the communication between slot 22 in tube 20 and slot 21 in tube 17. It will be understood that, due to creepage and splash of electrolyte within the cell, all surfaces therewithin are covered with a thin film of liquid. This liquid film, when arm 32 is turned, forms a liquid seal between arm 32 and tube 20 reinforcing the friction seal and gas is thereby prevented from passing around arm 32 and entering slot 21.

When water is added to the cell, the liquid level will, of course, rise and expel air or other gases from the cell through filling opening 15, the other normal exit for gases i. e. slots 22, 35 and 21 being closed by the rotation of arm 32 and the formation of the liquid seal. As the liquid level rises and reaches the bottom of filling tube 17, no further gas can escape through opening 15 and the liquid cannot rise further in the cell by reason of the gas trapped under the cover outside the filling tube. If the filling operation is further continued, the liquid will rise at an extremely rapid rate within filling tube 17, thus indicating that the cell is properly filled.

When closure 23 is moved to the closed position, slot 35 will again register with slots 21 and 22 thus permitting venting as hereinbefore explained. This will permit the excess liquid within filling tube 17 to subside and equalize the liquid level throughout the cell.

In Figures 6, 7, 8 and 9 is shown a modification of my device which will act not only as a level control and a closure but will also give a visible indication outside of the cell of the electrolyte within the cell. By such means a determination can be readily made as to whether or not water should be added to the cell.

United States Patent No. 2,468,833, issued to H. P. Murphy on May 3, 1949, and assigned to the assignee of this application, relates to a container liquid level indicating device of the type wherein a rod extends downwardly from the container cover to the normal liquid level, the bottom of the rod being adapted to transmit light when immersed in liquid and to reflect light when free thereof.

Such device can, as shown in Figures 6, 7, 8 and 9 be combined with the structure hereinbefore shown and described in order that there will be provided a filling and venting means fulfilling the dual functions of liquid level control and liquid level indication, such functions being complementary to each other looking toward the common goal of ease and efficiency in the maintenance of a storage battery.

Figure 6:
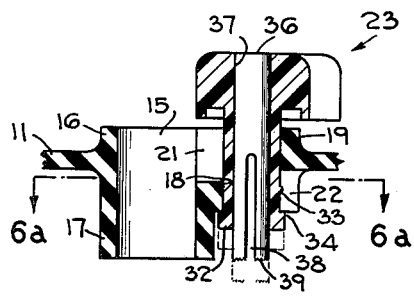
Figure 6 is an elevational view partially in cross section of another embodiment of my invention in the open position.
Figure 6A:
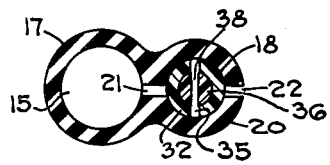
Figure 6a is a view taken along the line 6a—6a in Figure 6.
Figure 8:
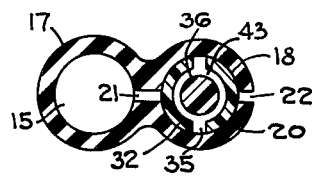
Figure 8 is a sectional view taken along the line 8—8 of Figure 7.

Figures 6 and 6a, views of my invention wherein closure 23 is in a position similar to Figure 3, show a level indicator 36 that can be made of polystyrene, methyl methacrylate or any other suitable synthetic resin. Indicator 36 is preferably in the form of a rod and, as shown in this figure can be inserted within bore 37 provided in arm 32 and vent plug 23. Indicator or rod 36 is adapted to be frictionally held within bore 37 in such close contact with arm 32 as to inhibit any escape of gas or electrolyte between arm 32 and rod 36. It will be noted that rod 36 is vertically slotted as at 38, such slot being so arranged as to register with slot 35 in arm 32 to permit venting of gases evolved in the cell as hereinbefore described. The lower end of rod 36, extending downwardly below filling tube 17 to the minimum desirable electrolyte level, i. e. to the lowest point to which the electrolyte level should be permitted to fall is roughened or serrated at 39. As described in U. S. Patent No. 2,468,833—H. P. Murphy, referred to above, when the lower end of the rod is covered by liquid, light traveling down the rod from outside the cell will be transmitted into the liquid and, as a result, the upper end of the rod will appear dark to the eye of an observer. On the other hand, however, if the electrolyte level has dropped below the end of the rod, light from outside the cell will be reflected by the roughened lower end of the rod back to the observer thereby making the rod appear light and indicating that the addition of water is necessary.

It will be understood that while rod 36 has been shown as having a lower end approximately parallel with the normal surface of the electrolyte, it can be tapered, rounded or have any other configuration that will produce the desired result. Furthermore, serrations 39 are only provided for the purpose of reflecting light if not covered by liquid and, therefore, any other construction such as, for example a frosted or etched finish, producing the same result would be suitable.

As has been hereinbefore described, the lower end of rod 36 extends to the minimum desirable electrolyte level when closure 23 is in the closed position. It will be understood that the distance that closure 23 can be raised from the closed position is equivalent to the distance that arm 32 is vertically movable within tube 20 i. e. the distance between the upper face of shoulder 33 and the corresponding portion of shoulder 34, both shoulders being formed externally on arm 32. Accordingly, if it is desired to obtain a dual indication of the fact that the electrolyte has reached the maximum desirable level, it is only necessary to make the distance shoulder 33— shoulder 34 equivalent to the distance from the top of the separators within the cell to the bottom of filling tube 17. If this is done, the bottom of rod 36 will be at a level with the bottom of filling tube 17 when closure 23 is in the open position and, when the electrolyte level has risen to the bottom of said tube, not only will the rapidly rising level within the tube signal that the cell is filled but the bottom of rod 36 will, at the same time, be immersed in liquid and appear dark.

Figure 7:
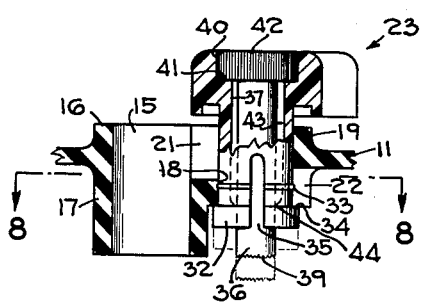
Figure 7 is a view similar to Figure 6 of another form of the invention in the open position.

A slightly different embodiment of the invention is shown in Figure 7. In this figure, bore 37 in arm 32 is provided with a counterbore 40 providing a seat 41 on which rests the enlarged head 42 of rods 36. Bore 37 is slightly larger than rod 36 thus providing a clearance 43 between arm 32 and said rod, the latter being held firmly within bore 37 by the friction fit of head 42 and the walls of counterbore 40, the lower end of said rod being held by shoulder 44 formed internally of arm 32. In this embodiment of the invention, slot 38 as shown in Figure 6, is unnecessary since gas vented through slots 22 and 35 into bore 37 will pass freely through clearance 43 around rod 36 and out through the other portion of slot 35 into slot 21. Protection against leakage of electrolyte or unwanted gassing is provided by two different points of contact, i. e., rod 36—shoulder 44, and head 42—counterbore 40.

Figure 9:
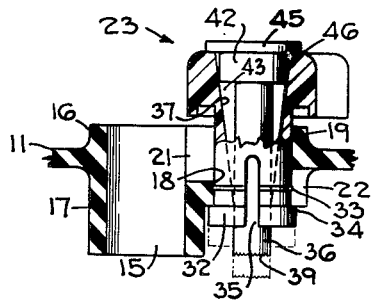
Figure 9 is an elevational view partially in cross section of another form of my invention in the open position.

Another arrangement of the invention is shown in Figure 9. In this figure, bore 37 is shown as tapering downwardly and inwardly within arm 32. Head 42 of rod 36 is provided with cap 45 adapted to seat upon the top of closure 23 as at 46. It will be noted that in this structure there are provided three points of protection against leakage of electrolyte or gassing, i. e. point 46, head 42—bore 37, and rod 36—bore 37. Here again, as in Figure 7, the necessary passage to permit venting of gases is provided by clearance 43 between rod 36 and the wall of bore 37.

It is apparent, therefore, that the objects of the invention have been fully achieved by the construction hereinbefore described. A filling and venting structure is provided by means of which a positive signal is given when a battery cell has been filled to the desired level and which will effectively prevent spitting, creepage, or other undesirable loss of electrolyte. Furthermore, by the use of another feature of the invention, such other feature being an integral part of the structure as a whole, it is possible to determine at once, without removing the closure member whether the electrolyte is at a desirable level.

The examples here given and the description set forth are merely presented as illustrative of and not as a limitation on the present invention. Other forms and variations coming within the scope of the appended claims will readily suggest themselves to those skilled in the art.

I claim:

1. A storage battery filling and venting structure, comprising a cell cover having a filling and venting opening therein, a filling tube extending downwardly from said filling and venting opening to approximately the maximum desirable electrolyte level, a second opening adjacent said filling and venting opening, a second tube extending downwardly from said second opening and having a portion of its wall in common with said filling tube, said common wall being provided with an aperture therethrough, closure means for said filling and venting opening permanently associated with said cell cover, said closure being provided with a depending slotted arm movably positioned within said second tube, said slot normally affording communication between the interior of said battery and said common aperture.

2. In a storage battery containing a quantity of electrolyte, a level control device, comprising a cover having a filling and venting opening therein, a filling tube extending downwardly from said filling and venting opening to the maximum desirable electrolyte level, a second opening adjacent said filling opening, a second tube extending downwardly from said second opening, an aperture diametrically formed in the wall of said second tube a portion of said aperture communicating with the interior of said filling tube, closure means for said filling and venting opening permanently associated with said cover, said closure being provided with a slotted depending arm rotatably positioned within said second tube, said slot normally registering with said aperture to permit the escape of gases from the interior of said battery through said aperture and said slot.

3. The device of claim 2 in which the depending arm includes means for the determination of electrolyte level within the cell.

4. The device of claim 2 in which the slotted depending arm includes an electrolyte level indicator comprising a rod pervious to the passage of light, the lower end of said rod being at approximately the minimum desirable electrolyte level, said rod being provided with a slot registering with the slot in said depending arm.

5. The device of claim 2 in which the slotted depending arm is provided with a vertical bore containing an electrolyte level indicator, comprising a rod pervious to the passage of light and so held within said bore that a clearance is provided between said rod and the wall of said bore, the lower end of said rod being at approximately the minimum desirable electrolyte level.

6. In a storage battery containing a quantity of electrolyte, a level control device, comprising a cover having a filling and venting opening therein, a filling tube extending downwardly from said filling and venting opening to the maximum desirable electrolyte level, a second opening adjacent said filling and venting opening, a second tube extending downwardly from said second opening and having a portion of its wall in common with said filling tube, a vertical slot diametrically formed through the wall of said second tube and said common wall, aperture closure means for said filling and venting opening permanently associated with said cover, a depending slotted arm affixed to said closure means rotatably positioned and vertically movable within said second tube, said slot registering with said slot in said second tube to permit gassing of the battery through said slots and said apertured closure means when said closure is in the closed position and being out of registry therewith when said closure is rotated whereby passing through said slots is prevented.

7. The device of claim 6 in which the slotted depending arm includes an electrolyte level indicator comprising a rod pervious to the passage of light, the lower end of said rod being at approximately the minimum desirable electrolyte level, said rod being provided with a slot registering with the slot in said depending arm.

8. The device of claim 6 in which the slotted depending arm is provided with a vertical bore containing an electrolyte level indicator, comprising a rod pervious to the passage of light and so held within said bore that a clearance is provided between said rod and the wall of said bore, the lower end of said rod being at approximately the minimum desirable electrolyte level.

9. The device of claim 6 in which the slotted depending arm is provided with a downwardly and inwardly tapering bore having inserted therethrough an electrolyte level indicator, comprising a rod pervious to the passage of light and having an enlarged cap portion to contact the top of said arm, the lower end of said rod being at approximately the minimum desirable electrolyte level.

10. A storage battery filling and venting structure, comprising a cell cover having a filling opening therein, a filling tube extending downwardly from said filling opening to approximately the maximum desirable electrolyte level, a second opening adjacent said filling opening, a second tube extending downwardly from said second opening, and closure means for said filling opening permanently associated with said cell cover, said means being provided with a depending arm rotatably positioned and capable of vertical movement within said second tube, and said depending arm including means for the determination of the electrolyte level within said storage battery cell.

11. A storage battery filling and venting structure, comprising a cell cover having a filling opening therein, a filling tube extending downwardly from said filling opening to approximately the maximum desirable electrolyte level, a second opening adjacent said filling opening, a second tube extending downwardly from said second opening, and closure means for said filling opening permanently associated with said cell cover, said means being provided with a depending arm rotatably positioned and capable of vertical movement within said second tube, depending arm including a rod pervious to the passage of light, the lower end of which is approximately at the minimum desirable electrolyte level and which will transmit light when immersed in the electrolyte and will reflect light when free thereof.

LESTER E. LIGHTON.

References Cited in the file of this patent

UNITED STATES PATENTS

| Number | Name | Date |
|---|---|---|
| 1,269,096 | Land | June 11, 1918 |
| 1,702,998 | Foltis | Feb. 9, 1929 |
| 1,986,313 | Winger | Jan. 1, 1935 |
| 2,220,005 | Smith | Oct. 29, 1940 |
| 2,302,719 | Sandusky | Nov. 24, 1942 |
| 2,302,720 | Sandusky | Nov. 24, 1942 |
| 2,346,313 | Keller | Apr. 11, 1944 |
| 2,468,833 | Murphy | May 3, 1949 |
| 2,506,952 | Doughty | May 9, 1950 |

FOREIGN PATENTS

| Number | Country | Date |
|---|---|---|
| 145,387 | Great Britain | July 2, 1920 |
| 436,761 | Great Britain | Oct. 17, 1935 |
| 851,026 | France | Jan. 2, 1940 |